March 1, 1955 J. A. PITNER 2,702,980
PICKUP ATTACHMENT FOR GRAIN HARVESTERS
Filed April 4, 1952 2 Sheets-Sheet 1
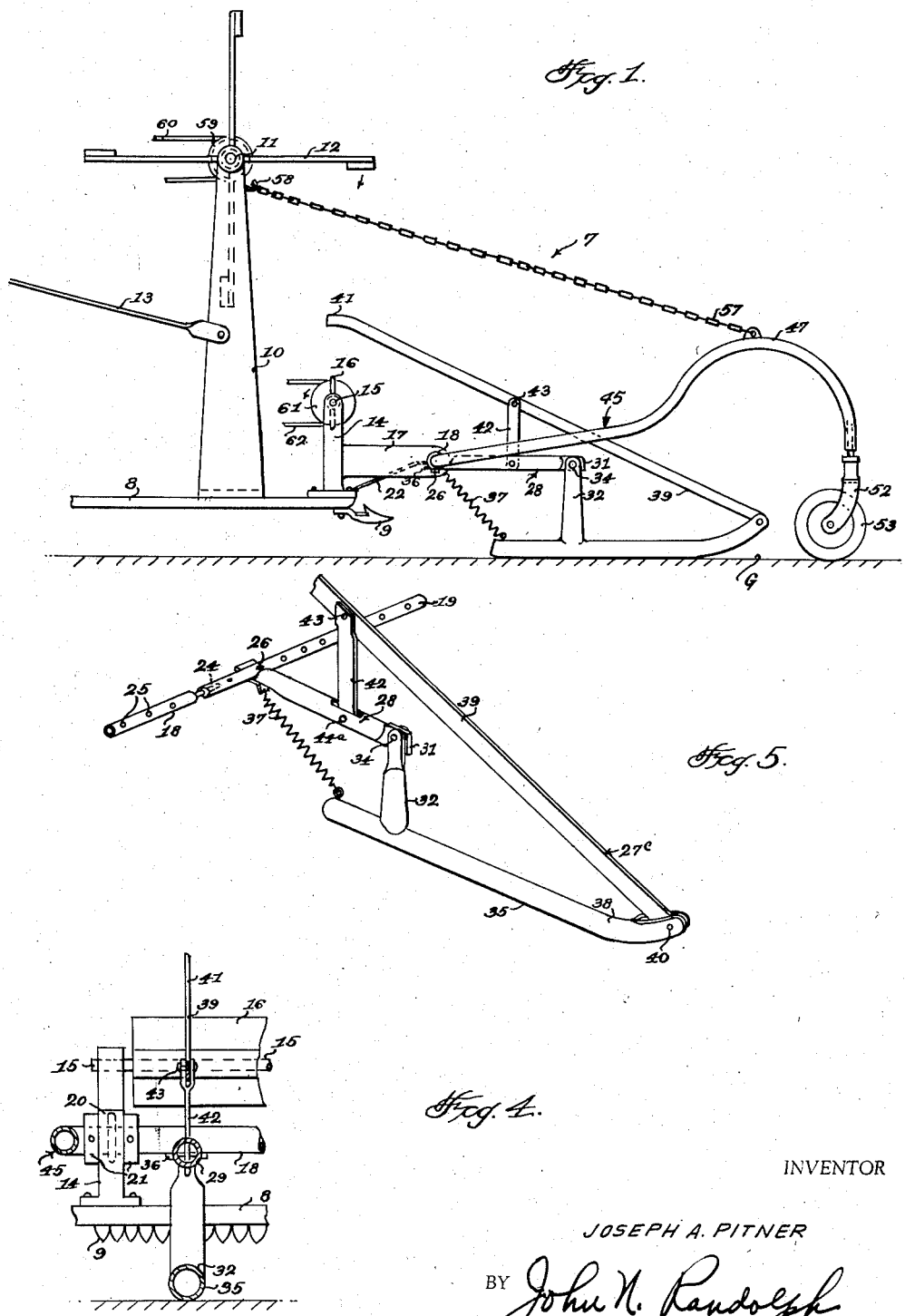
INVENTOR
JOSEPH A. PITNER
BY John N. Randolph
ATTORNEY March 1, 1955
J. A. PITNER
2,702,980
PICKUP ATTACHMENT FOR GRAIN HARVESTERS
Filed April 4, 1952
2 Sheets-Sheet 2
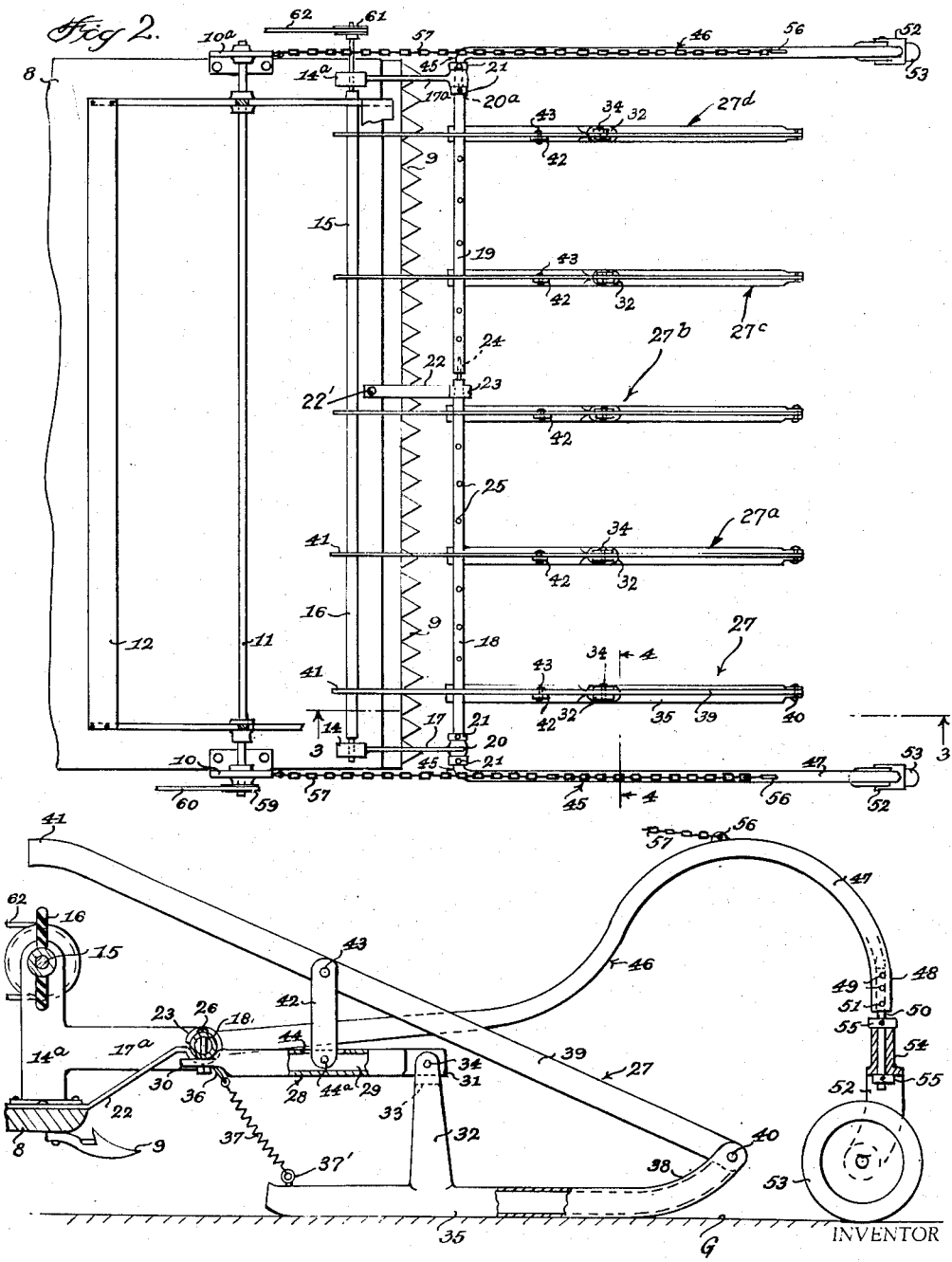
INVENTOR
JOSEPH. A PITNER
BY John N. Randolph
ATTORNEY

United States Patent Office 2,702,980
Patented Mar. 1, 1955

2,702,980

PICKUP ATTACHMENT FOR GRAIN HARVESTERS

Joseph A. Pitner, Minot, N. Dak.

Application April 4, 1952, Serial No. 280,506

5 Claims. (Cl. 56—312)

This invention relates to a novel attachment for grain harvesters generally and more particularly to attachments for combines which will effectively function for picking up the swaths of grain which are bent over toward the ground for delivering the grain to a combine or harvester without shelling the grain.

Another object of the invention is to provide a pickup attachment that will readily adjust itself to uneven ground surfaces and which is yieldable to pass over humps and into depressions in the path of movement of the attachment.

Still a further object of the invention is to provide an attachment having pickup elements which will not stir up the swaths so that the grain will not be blown away when the harvesting is done under windy conditions.

Another object of the invention is to provide a pickup attachment which may be adjusted for accommodating grain of different heights.

Various other objects and advantages of the invention will hereinafter become more fully apparent from the following description of the drawings illustrating a presently preferred embodiment thereof, and wherein:

Figure 1 is a side elevational view of the attachment in an operative position;

Figure 2 is a top plan view thereof;

Figure 3 is a longitudinal sectional view on an enlarged scale, taken substantially along a plane as indicated by the line 3—3 of Figure 2;

Figure 4 is an enlarged fragmentary transverse sectional view taken substantially along a plane as indicated by the line 4—4 of Figure 2, and Figure 5 is a fragmentary perspective view of a portion of the attachment.

Referring more specifically to the drawings, the novel pickup attachment in its entirety is designated generally 7 and to illustrate a preferred application and use thereof, the forward portion of a harvester or combine platform is illustrated in the drawings and designated generally 8. A conventional sickle bar 9 is secured to the platform 8 and projects forwardly from the leading edge of the platform 8.

The attachment 7 includes a pair of bearing standards 10 and 10a which are secured to and rise from the platform 8, one adjacent each side edge thereof and near its leading end. A shaft 11 extends through and is journalled in the upper ends of the bearing standards 10 and 10a and has a large reel 12 fixed thereto for rotation between said bearing standards. The bearing standards may be provided with suitable braces 13 which are fixed to and extend rearwardly therefrom to a suitable part in the harvester or combine, not shown, on which the bearing standards may be braced.

A second pair of relatively small bearing standards 14 and 14a are fixed to and rise from the platform 8 adjacent its side edges and leading end and forwardly of the standards 10 and 10a. A shaft 15 extends through and is journalled in the upper ends of the bearing standards 14 and 14a and has a beater member 16 fixed thereto and rotatably disposed between the bearing standards 14 and 14a. The beater 16 is relatively small in cross section and is preferably provided with only two blades which are oppositely disposed and which are preferably formed of a flexible material such as rubber.

The bearing standards 14 and 14a near lower ends thereof are provided with forwardly extending arms 17 and 17a, respectively, which project beyond the leading end of the platform 8. A pair of shafts 18 and 19 are journalled adjacent their outer ends in the arms 17 and 17a, respectively, which arms are provided with bearing portions 20 and 20a, respectively, at their forward ends and through which the shafts 18 and 19 extend and are journalled for rotation in a horizontal plane. A pair of retaining collars 21 are detachably secured to each shaft 18 and 19 and are disposed on opposite sides of the bearings 20 and 20a to retain the shafts against sliding movement through said bearings. An arm 22 is secured at its rear end at 22' to the upper side of the leading end of the platform 8 and extends forwardly therefrom and is provided with a bearing portion 23 at its forward end in which a portion of the shaft 18, located adjacent its inner end, is journalled. The shaft 18 at its inner end is provided with a restricted stem 24 which turnably engages the inner end of the shaft 19 and which provides a support and journal for the inner end of said shaft 19, permitting said shafts to turn independently of one another.

The shafts 18 and 19 are provided with a series of longitudinally spaced openings 25 which are normally disposed in vertical positions and in which are selectively mounted the bolts of nut and bolt fastenings 26. Each nut and bolt fastening 26 detachably mounts a lifter unit on either the shaft 18 or the shaft 19. The lifter units designated generally 27, 27a, 27b, 27c and 27d, each includes a supporting arm 28, the intermediate portion of which is preferably tubular, as seen at 29. Each arm 28 has a flattened rear end portion 30 which is disposed in a horizontal plane and which is downwardly offset relatively to the upper part of the tubular portion 29. The flattened end 30 is disposed beneath either the shaft 18 or 19 and one of the fastenings 26 extends therethrough for securing the arm 28 at its rear end to either the shaft 18 or 19. The upper part of the rear end of the tubular portion 29 abuts the forward part of the shaft 18 or 19 to prevent the arm 28 from swinging relatively to the shaft about the fastening 26 as a pivot. Each arm 28 is provided with a flattened forward end 31 which is disposed in a vertical plane and which loosely fits into a bifurcated upper end of a hanger 32. A pivot pin 34 extends through the bifurcated upper end 33 and through the flattened end 31 for swingably connecting the hanger 32 to the forward end of the arm 28 for swinging movement in a vertical plane longitudinally of said arm. An elongated runner 35 is secured to the lower end of the hanger 32 and disposed therebeneath. Said hanger and runner being connected nearer the trailing end than the forward end of the runner. An anchor member 36 is secured to the fastening 26 of each lifter unit. A pull spring 37 is secured at 37' to the trailing end of each runner 35 and extends upwardly therefrom and is anchored at its upper end to the anchor 36 for yieldably urging the runner 36 and hanger 32 to swing clockwise about the pivot 34, as seen in Figure 3, for displacing the forward end of the runner 35 downwardly. The runner 35 is provided with an upwardly curved forward end 38 to the terminal of which a lifter element or bar 39 is pivotally connected at its forward end at 40 for swinging movement about a horizontal axis. The lifter element or bar 39 extends upwardly and rearwardly at an incline from the forward end of the runner and has a rear end 41 terminating above and spaced from the beater 16. A rigid link 42 is pivotally connected at 43 at its upper end to the intermediate portion of the lifter element 39. The lower end of the link 42 extends into the tubular arm portion 29 and loosely through an elongated slot 44 therein and is pivotally connected to the arm 28 by a horizontal pivot pin 44a. Accordingly, the bar or lifter element 39 is supported by the link 42 and pivot 40 for rocking movement with the runner 35 and hanger 32 as said hanger swings about its pivot 34 and the runner is normally maintained in substantially a horizontal position in engagement with the ground surface, as indicated at G, by the pull spring 37. The outer ends of the shafts 18 and 19, outwardly of the bearings 20, are bent at right angles to provide forwardly extending crank arms 45 and 46, respectively, each of which is provided with an upwardly and then downwardly curved forward end portion 47 having a downwardly extending tubular terminal portion 48 which is provided with a series of longitudinally spaced openings 49. The upper end of a kingpin 50 extends into and is secured to each terminal 48 by a fastening 51 which extends therethrough and through one of the openings 49 whereby the elevation of the lower end of the kingpin 50 may be varied relatively to the crank terminal 48, to which it is connected. Each kingpin 50 swivelly supports a caster wheel fork 52 having a caster wheel 53 journalled in the lower end thereof and which is adapted to ride along the ground surface G. Each fork 52 is provided with an upstanding sleeve 54 at its upper end which turnably engages the lower part of the kingpin 50 to which it is connected, below the crank terminal 48, and which is retained in engagement therewith by removable collars 55 which are secured to the kingpin 50 above and below the sleeve 54. Each crank portion 47 is provided with an upstanding apertured ear 56 to which one end of a flexible member such as a chain 57 is secured. The chains 57 extend upwardly and rearwardly from said crank portions 47 and are detachably and adjustably anchored at their opposite, rear ends to hooks 58 which are secured to the bearing standards 10 and whereby the cranks 45 and 46 are supported and prevented from swinging downwardly below a predetermined angle relatively to the ground surface G, as best illustrated in Figure 1. It will also be apparent that the shafts 18 and 19 are thus prevented from turning in the bearings 20 in directions to permit the lifter units 27 to swing downwardly below a desired position.

Assuming that a harvester or combine of which the platform 8 forms a part is moving through a field of grain in a direction from left to right as illustrated in Figures 1 and 2, the runners 35 of the lifter units 27, 27a, 27b, 27c and 27d will ride over the ground surface and swaths of grain, not shown, which have been previously cut by the sickle assembly 9 and before application of the attachment 7 and which swaths are bent downwardly toward the ground will be engaged by the forward ends of the lifter elements 39 which will engage therebeneath, causing the swaths to ride up the upwardly and rearwardly inclined surfaces of said elements 39 as the unit 7 is advanced forwardly or from left to right and be discharged from the upper rear ends 41 of the lifter elements 39 onto the platform 8. If the ground surface G over which the unit 7 is moving is inclined transversely of its direction of travel, the caster wheel 53 of one of the crank arms may be disposed above the level of the caster wheel of the other crank arm causing one of the shafts 18 or 19 to turn relatively to the other shaft to raise or lower the lifting units, carried by one or the other of the shafts, which is turned in one direction or the opposite direction by the upward or downward swinging movement of its crank 46 or 47. The lifter units will thus be lowered or raised to better conform to the ground level over which said lifter units are passing. Furthermore, the runners 35 of the individual lifter units may yield in passing over a hump. When this occurs, the forward runner end 38 will ride up on the hump causing the runner 35 and hanger 32 to pivot relatively to its supporting arm 28 about its pivot point 34 and the lifting element 39 of said unit will rock about the swinging fulcrum afforded by its supporting link 42 which will pivot relatively to the arm 28 on its pivot 44a and will allow said lifting element to pivot relatively thereto about the pivot 43. The lifting element 39 may also pivot relatively to the runner 38 about its forward pivot 40. After a runner 35 passes over a hump or uneven ground surface, the spring 37 will swing the runner back to a horizontal ground engaging position, as illustrated in Figure 3. It will thus be seen that the lifter units carried by each of the shafts 18 and 19 may swing as a unit with the shaft and its crank arm relatively to the lifter units of the other shaft, and it will also be apparent that the individual lifter units may rock about their arms 28 relatively to the two shafts 18 and 19 and the other lifter units. The additional openings 25 are provided so that any desired number of lifter units may be employed and spaced any desired distances apart, depending upon the height of the grain being harvested, and it will be obvious that where the grain is tall fewer lifter units spaced a greater distance apart will be required than for harvesting shorter grains.

If desired, the chains 57 may be slacked off when the device is in operation so that the caster wheels 53 will completely support the lifter units carried by the shafts 18 and 19 of said crank arms which are associated with the caster wheels. Additionally, the chains or flexible members 57 may be employed for supporting the crank arms 46 and 47 in positions elevated substantially above their positions of Figures 1 and 3, so that the wheels 53 and runners 35 may thus be supported in transport positions substantially above and out of engagement with the ground surface G.

One end of the shaft 11 projects outwardly from the bearing standard 10 and has a V-belt pulley 59 fixed thereto and which is driven by an endless belt 60 which extends rearwardly therefrom and which may be driven from any suitable part of the harvester or combine on which the unit 7 is mounted. Similarily, the shaft 15 projects outwardly from the bearing standard 14a at the opposite side of the platform 8 and has a V-belt pulley 61 fixed thereto and driven by an endless belt 62 which may likewise be connected to any suitable part of the harvester or combine. The reel 12 and beater 16 are driven in opposite directions, the beater 16 being driven in a counterclockwise direction, as illustrated in Figure 1, for throwing the grain upwardly after it falls from the rear ends 41 of the lifter elements 39 and the reel 12 being driven clockwise, as seen in Figure 1, for directing the grain rearwardly from said beater. It will be understood that the sickle assembly 9 does not operate when the attachment 7 is mounted on the platform 8.

Various modifications and changes are contemplated and may obviously be resorted to, without departing from the spirit or scope of the invention as hereinafter defined by the appended claims.

I claim as my invention:

1. A grain pickup attachment for a harvesting machine comprising bearing members adapted to be connected to and extending forwardly from the leading edge of a harvester platform, a shaft journalled in said bearing members and disposed transversely of the platform, a plurality of grain lifter units fixedly connected to and extending forwardly from said shaft in spaced relationship to one another, each of said lifter units including an upwardly and rearwardly inclined lifter element extending from adjacent the forward end of the lifter unit over said shaft and to substantially therebeyond, each of said lifter units including a supporting arm fixed to and extending forwardly from the shaft, a hanger pivotally connected to and depending from each supporting arm for swinging movement longitudinally of the supporting arm, a runner fixed to the lower end of said hanger at a point spaced from the runner ends and having an upturned leading end, the forward end of the lifter element being pivotally connected to the forward end of the runner, a link pivotally connected to and rising from said arm and having an upper end pivotally connected to an intermediate portion of said lifter element, the axes of the lifter element pivots and link pivots being disposed parallel to one another and to the pivot axis of the hanger.

2. A grain pickup attachment as in claim 1, and a pull spring connected to the rear end of each runner and anchored to the supporting arm for urging the forward end of the runner downwardly.

3. A grain pickup attachment for a harvesting machine comprising bearing members adapted to be connected to and extending forwardly from the leading edge of a harvester platform, a shaft journalled in said bearing members and disposed transversely of the platform, a plurality of grain lifter units fixedly connected to and extending forwardly from said shaft in spaced relationship to one another, each of said lifter units including an upwardly and rearwardly inclined lifter element extending from adjacent the forward end of the lifter unit over said shaft and to substantially therebeyond, said shaft being formed of end sections having adjacently disposed swivelly connected ends, and means individual to the shaft sections for supporting the lifter units thereof in operative positions and for imparting torque to the shaft sections for elevating the lifter units of either shaft section relatively in the lifter units of the other shaft section.

4. A grain pickup attachment as in claim 3, said last mentioned means comprising forwardly extending crank arms forming extensions of the outer ends of said shaft sections, and ground engaging caster wheels connected to the forward ends of said arms for supporting the arms and shaft sections associated therewith and for supporting the lifter units of the shaft sections.

5. A grain pickup attachment as in claim 4, and means for adjustably supporting said arms in upwardly extending positions for supporting the grain pickup units in upwardly extending transport positions.

References Cited in the file of this patent

UNITED STATES PATENTS

| | | |
|---|---|---|
| 498,205 | Burdin | May 23, 1893 |
| 643,052 | Haines et al. | Feb. 6, 1900 |
| 991,243 | Rand | May 2, 1911 |
| 1,819,432 | Mickle | Aug. 18, 1931 |
| 1,919,896 | MacGregor | July 25, 1933 |
| 2,168,266 | McElwain | Aug. 1, 1939 |

FOREIGN PATENTS

| | | |
|---|---|---|
| 69,700 | Norway | Oct. 29, 1945 |